US012499732B1

(12) United States Patent
Olmstead

(10) Patent No.: US 12,499,732 B1
(45) Date of Patent: *Dec. 16, 2025

(54) TICKET MANAGEMENT SYSTEM

(71) Applicant: Mark Olmstead, Fort Worth, TX (US)

(72) Inventor: Mark Olmstead, Fort Worth, TX (US)

(*) Notice: Subject to any disclaimer, the term of this patent is extended or adjusted under 35 U.S.C. 154(b) by 861 days.

This patent is subject to a terminal disclaimer.

(21) Appl. No.: 17/556,486

(22) Filed: Dec. 20, 2021

Related U.S. Application Data

(63) Continuation-in-part of application No. 16/601,249, filed on Oct. 14, 2019, now Pat. No. 11,205,322.

(51) Int. Cl.
*G07F 17/32* (2006.01)
*G06Q 20/36* (2012.01)
*G06Q 50/34* (2012.01)

(52) U.S. Cl.
CPC ....... *G07F 17/3251* (2013.01); *G06Q 20/363* (2013.01); *G06Q 50/34* (2013.01); *G07F 17/3239* (2013.01); *G07F 17/3241* (2013.01)

(58) Field of Classification Search
CPC ............. G07F 17/3251; G07F 17/3239; G07F 17/3241; G06Q 20/363; G06Q 50/34
See application file for complete search history.

(56) References Cited

U.S. PATENT DOCUMENTS

| | | | | |
|---|---|---|---|---|
| 4,926,327 A | * | 5/1990 | Sidley | A63F 13/55 463/28 |
| 6,500,067 B1 | * | 12/2002 | Luciano | G07F 17/3248 463/19 |
| 11,205,322 B2 | * | 12/2021 | Olmstead | G07F 17/3232 |
| 2002/0169020 A1 | * | 11/2002 | Saunders | G07F 17/32 463/25 |
| 2003/0014370 A1 | * | 1/2003 | Charrin | G07F 7/0873 705/65 |
| 2004/0147309 A1 | | 7/2004 | Chamberlain | |
| 2005/0096126 A1 | * | 5/2005 | Prasad | G07F 17/32 463/25 |
| 2005/0215316 A1 | * | 9/2005 | Rowe | A63F 13/30 463/29 |

(Continued)

OTHER PUBLICATIONS

Notice of Allowance dated Oct. 8, 2021 from U.S. Appl. No. 16/601,249.

(Continued)

*Primary Examiner* — Carl V Larsen
(74) *Attorney, Agent, or Firm* — James E. Walton

(57) ABSTRACT

A ticket management system includes a gaming establishment management tool, a gaming device, and a virtual wallet stored on a mobile device. A printer is located in a back office of the gaming establishment to print, store, track, and easily locate tickets. The tickets include financial transactional data, such as a cashout transaction, including a cashout amount and a gaming machine associative identifier. An accounting management tool and the virtual wallet exchange financial transaction data to properly record and display gaming account balances, gaming credits, and identifiers. The gaming establishment management tool, the gaming device, and the printer each include scanners, configured as validators, to validate a ticket, a gaming machine transaction, or a virtual wallet transaction respectively. The virtual wallet may be linked to or stored on a player tracking card issued by the gaming establishment.

6 Claims, 13 Drawing Sheets

(56) References Cited

U.S. PATENT DOCUMENTS

| | | | |
|---|---|---|---|
| 2005/0282626 A1* | 12/2005 | Manfredi | G07F 17/3248 463/25 |
| 2006/0142079 A1* | 6/2006 | Ikehara | G07F 17/32 463/27 |
| 2006/0281539 A1* | 12/2006 | Wilhite | G07F 17/3248 463/25 |
| 2007/0218981 A1* | 9/2007 | Brunet De Courssou | G07F 17/3248 463/25 |
| 2008/0200255 A1 | 8/2008 | Eisele | |
| 2011/0070945 A1 | 3/2011 | Walker | |
| 2011/0086696 A1* | 4/2011 | MacEwan | G07F 17/32 463/43 |
| 2011/0207529 A1* | 8/2011 | Acres | G07F 17/3218 463/43 |
| 2011/0300922 A1* | 12/2011 | Lyons | G07F 17/3258 463/25 |
| 2012/0142403 A1 | 6/2012 | Prather | |
| 2013/0203489 A1* | 8/2013 | Lyons | G07F 17/3209 463/30 |
| 2015/0170469 A1* | 6/2015 | Arnone | G07F 17/3225 463/25 |
| 2015/0170473 A1* | 6/2015 | Hematji | G06Q 20/4012 463/25 |
| 2015/0339654 A1 | 11/2015 | Warner | |
| 2016/0071371 A1* | 3/2016 | Pececnik | G07F 17/3248 463/25 |
| 2017/0024975 A1* | 1/2017 | Chun | G07F 17/322 |
| 2017/0092054 A1* | 3/2017 | Petersen | G06Q 20/3274 |
| 2017/0092062 A1* | 3/2017 | Tsutsui | G06Q 30/0271 |
| 2018/0061179 A1* | 3/2018 | Miri | G07F 17/3241 |
| 2019/0096180 A1* | 3/2019 | Petersen | G07F 17/3211 |
| 2019/0139019 A1* | 5/2019 | Bloys | G06Q 20/3223 |
| 2020/0111319 A1* | 4/2020 | Palmisano | G06Q 50/34 |

OTHER PUBLICATIONS

Office Action dated Mar. 24, 2021 from U.S. Appl. No. 16/601,249.
Amendment dated Jun. 17, 2021 from U.S. Appl. No. 16/601,249.

* cited by examiner

TICKET MANAGEMENT SYSTEM

This application is a continuation-in-part of U.S. patent application Ser. No. 16/601,249, filed on 14 Oct. 2019, titled "Ticket Management System," which is incorporated herein by reference for all purposes.

BACKGROUND

1. Field of the Invention

The present application relates to ticket management systems. In particular, the present application relates to ticket management systems for the gaming industry.

2. Description of Related Art

Currently, gaming machines, such as those used in class-one sweepstakes, class-two untaxed eight-liner/bingo machines, and class-three random or casino machines, use cumbersome and unreliable ticket management systems and inefficient processes. For example, these gaming machines often require ticket sorters, ticket-in-ticket-out (TITO) validators, and time-consuming, costly processes performed by operators or employees. These processes include employees traversing the gaming establishment floor, opening the gaming machines, emptying storage bins, and carrying the contents to a storage room. The storage bin contents arriving at the storage room includes both tickets and cash, requiring a sorting procedure that results cash being deposited and tickets being stored. At least during the emptying of the machine storage bins, the gaming machines are inaccessible to customers, costing the gaming establishment not only the expense of using an employee to manually empty the storage bins, but also the expense of having an inaccessible gaming machine.

Although the tickets generated by the printers of such systems contain useful information, such as cashout amounts, accurate recordkeeping and tracking of the tickets is expensive, time-consuming, and often non-existent. Unfortunately, current tracking management systems provide few if any options for gaming establishments seeking to create redundant virtual or physical documentation of cashout transactions. They also provide few options for tracking transactions and locating specific transactions associated with specific games. Foreseeing potential financial regulations, or attempting to meet existing financial and legal requirements, these gaming establishments often keep numerous, bulky bags and storage containers on-site or in costly storage facilities. Furthermore, tickets are being printed now with identifying features, making counting and validating easier. However, the ability to track and locate specific transactions on specific tickets and produce useable data from the information printed on them is nearly impossible if the tickets are haphazardly dumped and stored in unreliable containers. For example, the use of storage bags means the contents are not organized, the storage container is fragile, and the bags are not uniform in size, making transportation difficult and the probability of losing tickets and the data printed thereon extremely high.

Although the aforementioned methods of managing information printed on tickets represent great strides in the area of ticket management systems, many shortcomings remain.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION OF THE PREFERRED EMBODIMENT

Figure 1:
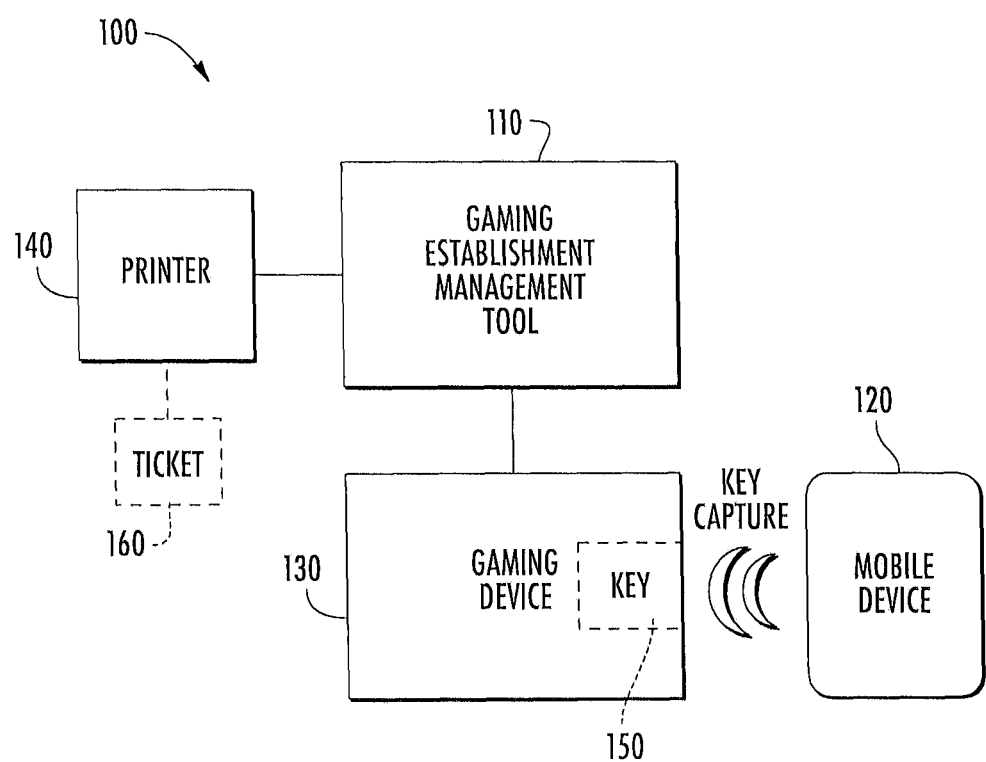
FIG. 1 is a block diagram of a ticket management system.

Referring to FIG. 1 in the drawings, a ticket management system 100 is illustrated. Ticket management system 100 includes a gaming establishment management tool (GEMT) 110, a mobile client device 120, a gaming client device 130, a printer 140, and an image key 150, such as a three-dimensional (3D) quick response (QR) code. Ticket management system 100 prints customer account information on ticket 160 and stores ticket 160 in a manner that can be easily stored, tracked, and located.

GEMT 110 and gaming device 130 are connected together using wired network connections, such as twisted pair, Ethernet, fiber optics, Cat5, Cat6, or similar network connections. Printer 140 is connected to GEMT 110 using a network connection. Mobile device 120 is connected to GEMT 110 and gaming device 130 over a mobile or a wireless network connection. Mobile and wireless network connections are established through base stations, broadband modems, switched telephone networks, routers, and the Internet using established procedures and communication protocols, including, but not limited to, TCP/IP, IPv4, and IPv6.

Image key 150 is provided by gaming device 130 on a display screen. The image key is used to connect gaming transactions occurring on a mobile device with a specific and unique statistical analysis system (SAS) machine maintained by the gaming establishment.

In an alternative embodiment, image key 150 is permanently affixed to the console or frame of gaming device 130. Image key 150 is configured to be read by a QR scanner integral to mobile device 120 using ISO/IEC 18004:2015 and ISO/IEC JTC 1/SC 31 standards. Image key 150 may also include a micro QR code or a similar distinctive image code variant.

In yet another embodiment, image key 150 is replaced, or used in conjunction with, another secure form of an authentication key. For example, in at least one embodiment, the authentication key includes an audio key, a biometric key, such as a fingerprint or facial features used together with facial recognition algorithms, a short-range encrypted RF signal, such as a Bluetooth signal, and combinations thereof.

Figure 2:
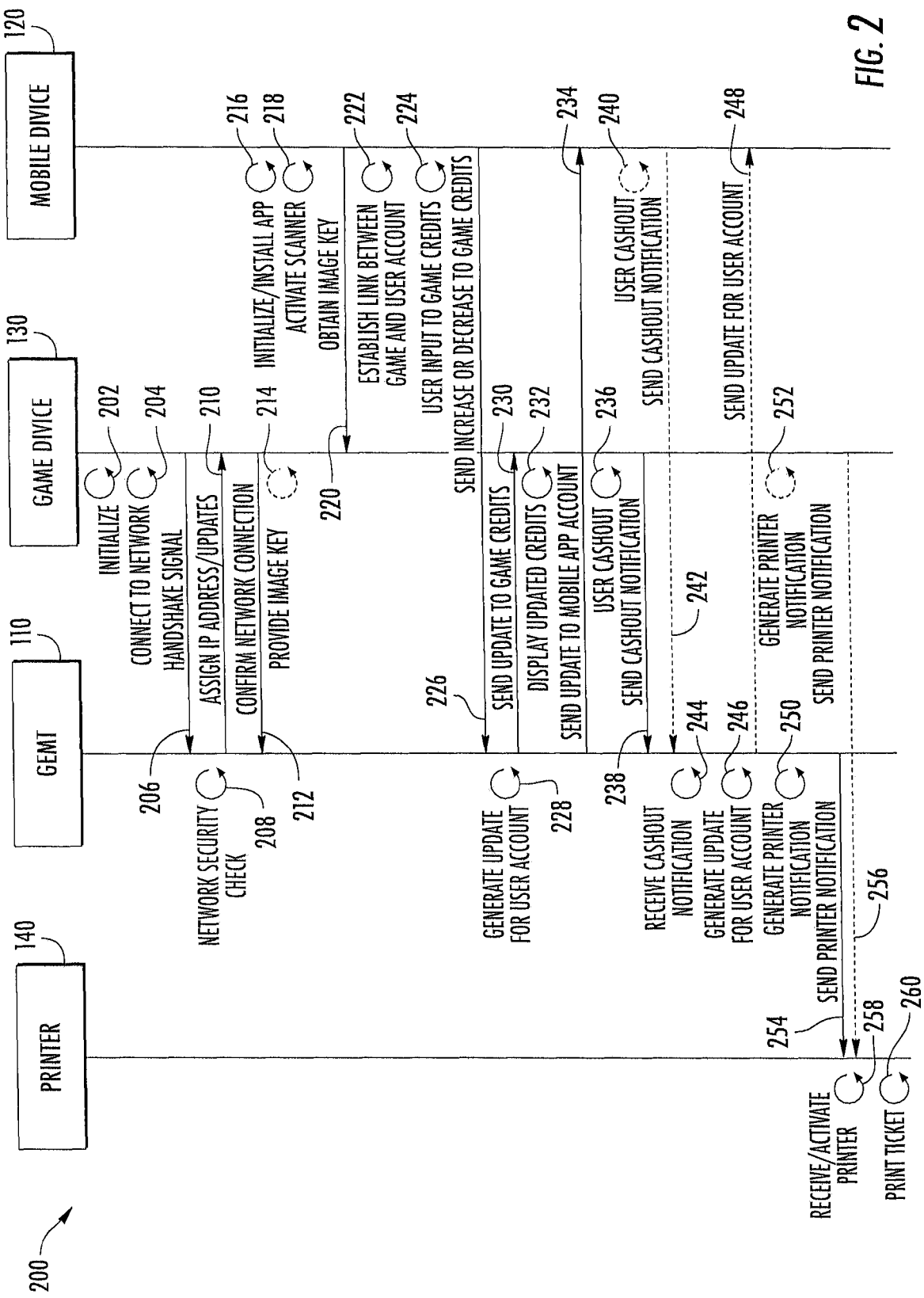
FIG. 2 is a time-sequence diagram of a method performed by the ticket management system shown in FIG. 1.

Referring now also to FIG. 2 in the drawings, ticket management system 100 uses method 200 to print customer account information on a ticket. Step 202 of method 100 includes initializing a gaming device in a gaming establishment. For example, gaming device 130 is powered on and port connectors connected.

Step 204 includes connecting the gaming device to the gaming establishment network. For example, GEMT 110 may be configured to use an Ethernet protocol, a SAS communication protocol, or both. Step 204 further includes configuring gaming device 130 to communicate with GEMT 110 according to the appropriate one or more protocols.

Step 206 includes sending a low power or low bandwidth communication signal to the gaming establishment network. For example, gaming device 130 sends a handshake signal to GEMT 110, requesting access to the network.

Step 208 includes performing a network security check and connecting the gaming device to the gaming establishment network based on the result of the security check. For example, step 208 includes checking tables for appropriate source, destination, or MAC addresses. Step 208 may also include checking the frequency of attempts to establish the network connection.

Step 210 includes granting the gaming device access to the gaming establishment network. For example, step 210 includes assigning an IP address, sending the IP address to the gaming device, and connecting the gaming device to the intranet of the establishment. Because gaming device 130 may previously have been in storage, in at least one embodiment, step 210 further includes providing updates, including firmware updates, to gaming device 130 after the network connection is established.

Step 212 includes sending a signal to confirm that the network connection is established. For example, gaming device 130 sends a signal to GEMT 110 over a newly established network connection. GEMT 110 receives the signal over the newly established network connection, confirming proper setup.

Step 214 includes providing an authentication key to a user operating a mobile device in order to enable the user to begin game play mode. For example, step 214 may include rendering and displaying image key 150 on a display screen of gaming the gaming machine in a conspicuous location on the display.

In an alternative embodiment, image key 150 is affixed to a portion of the console or frame of the gamine machine, making electronic providing and rendering of the image key in step 214 optional.

In yet another embodiment, step 214 further includes providing both the rendered image key and the affixed image key. The affixed image key providing entry and game play mode to the customer, and the rendered image key providing an amount associated with a cashout transaction.

Step 216 includes installing and initializing a gaming establishment user interface (UI) onto a mobile device. For example, mobile device 120 is user-controlled and operated, requiring the user to access a database and download the necessary UI to play games within the establishment. In an alternative embodiment, step 216 includes employees of the gaming establishment pre-installing the necessary UI on establishment-owned, user-controlled mobile devices, such that customers entering the establishment are provided with a pre-installed mobile device to play games within the establishment.

Step 216 further includes the user funding their gaming account. For example, the UI on mobile device 120 allows crediting or increasing a gaming account balance from zero to a desired amount by removing funds from a digital or virtual wallet and transferring them into the gaming account.

Step 218 includes activating the scanner or camera of a user device in close proximity to the gaming device the user wishes to play. For example, mobile device 120 may have an eight-liner UI installed on it, which receives user input through activation of an active icon of the UI, automatically activating the scanner of the mobile device in order to play the eight-liner bingo game.

Step 220 includes obtaining the authentication key to initiate game play. For example, upon pressing an active icon of the UI, the scanner of mobile device 120 is placed near image key 150. The scanner automatically processes gaming machine identifiers, such as hashtags and corresponding table entries, associated with image key 150 and gaming machine 130.

Step 222 includes establishing a link between the gaming device and the gaming account to conduct financial, gaming transactions via the UI installed on the mobile device that affect game play at the gaming device.

In an alternative embodiment, at least two links are established between the gaming device and two different gaming accounts. For example, two users each having their separate mobile devices with separate gaming accounts on each, such as a husband and wife, may wish to pool funds from the separate accounts to increase game play credits available on the gaming machine.

Step 222 further includes generating and rendering a display screen indicator to show that an active link between the gaming device and a mobile device has been established. This indicator may help prevent additional customers from unknowingly contributing to the active game play of another customer.

Step 224 includes receiving user input at the mobile device to increment or decrement the gaming account. For example, the user may decrement their gaming account balance thereby increasing gaming credits.

Step 226 includes sending the gaming transaction from the mobile device to the gaming establishment network. For example, mobile device 120 may send a packet of information, with the payload containing transactional data, such as a gaming account credit, to GEMT 110.

Step 228 includes receiving the packet including the transactional data and generating an update to the gaming account of the user operating the mobile device. For example, GEMT 110 may generate the update for the user gaming account based on the transaction received from mobile device 120.

Step 228 further includes generating a gaming credit update for gaming device 130. The gaming credit update includes an increase or a decrease to the default zero gaming machine credits displayed on a gaming machine screen.

Step 230 includes sending the gaming credit update to gaming device 130. For example, a packet of information including the gaming credit updates are sent to gaming device 130. By way of another example, if the Ethernet connection is down or not functioning, the gaming credit updates may be sent using the Serial SCSI Protocol (SSP).

Step 232 includes receiving, at gaming device 130, the gaming credit update from GEMT 110. The receipt of the update triggers a display of the updated gaming credits on gaming device 130.

Step 234 includes sending the gaming account update to the mobile device such that the gaming account displayed on the mobile device represents a current account balance. This step is nearly simultaneous with step 232. For example, as soon as the user sees gaming device 130 increase in gaming credits as a result of a gaming transaction, mobile device 120 receives the gaming account update from GEMT 110 to update the display of the gaming account balance to the user.

Step 236 includes receiving user input at the gaming machine to terminate game play. For example, the machine console of gaming device 130 may include a cashout button or active icon, which when activated will indicate to gaming device 130 that game play has ended and a cashout transaction is desired.

Step 236 further includes generating a cashout notification. For example, the packet header includes metadata, such as header length, indicating that the message is a cashout notification and the payload includes the cashout amount, machine identifiers, and other locating/tracking information.

Step 238 includes sending the cashout notification, from gaming device 130 to GEMT 110.

In an alternative embodiment, at step 240, the mobile device may optionally generate the cashout notification. For example, the UI on mobile device 120 may include a 'terminate game play' icon or a 'cashout' active icon, and activating either icon results in generating a cashout notification.

Step 242 includes optionally sending the cashout notification from mobile device 120 to GEMT 110. Step 242 is dependent on the mobile device being configured to generate the cashout notification. For example, step 242 only occurs if the optional step 240 occurs.

Step 244 includes receiving the cashout notification at GEMT 110. The receipt of the notification acts as a trigger to start step 246.

Step 246 includes generating, at GEMT 110, an account balance and an update for the gaming account of the user based on the cashout notification.

Step 248 includes optionally sending the update generated in step 246 from GEMT 110 to mobile device 120. Step 248 is dependent on the account balance generated in step 246. For example, when the game play at gaming device 130 results neither an increase or a decrease to the gaming account of the user or there is no cashout because losses depleted all credits without any winnings, then step 248 would not need to send an update to the gaming account displayed on mobile device 120.

Step 250 includes generating a printer notification. For example, GEMT 110 may generate a signal that includes a packet of information to be printed on ticket 160. Information to be printed on ticket 160 includes gaming establishment identifiers, transaction identifiers, validation identifiers and confirmation codes, transaction types, transaction amounts, dates, and time, duration or deadlines for future transactions (e.g., cashout amount valid until the end of the month), manufacture identifiers, and a second key image. The gaming establish identifiers include address and phone number. The transaction identifiers, validation identifiers, and confirmation codes include numeric sequences, alphanumeric sequences, or hashtags associated with the transaction, validation, or confirmation code. The transaction types include cashout and balance. The second key image includes a two-dimensional barcode or a second QR code.

In an alternative embodiment, step 252 includes optionally using gaming device 130 to generate the printer notification for the printer.

Step 254 includes sending, from GEMT 110, the printer notification to printer 140.

Step 256 includes optionally sending, from gaming device 130 the printer notification to printer 140. Step 256 depends on the gaming device being configured to generate the printer notification, as discussed in step 252.

Step 258 includes receiving the printer notification. The receipt of the notification acts as a trigger to activate the printer, which previously was in a sleep mode or a state of low activity.

Step 260 includes using the information from the printer notification to print and store the ticket. For example, printer 140 may print ticket 160 from a role of blank tickets and store it in a role of printed tickets. Attached between the blank role and the printed role is a ticket reader/scanner to read the information printed on ticket 160, or any other ticket, from the role of printed tickets.

Figure 3:
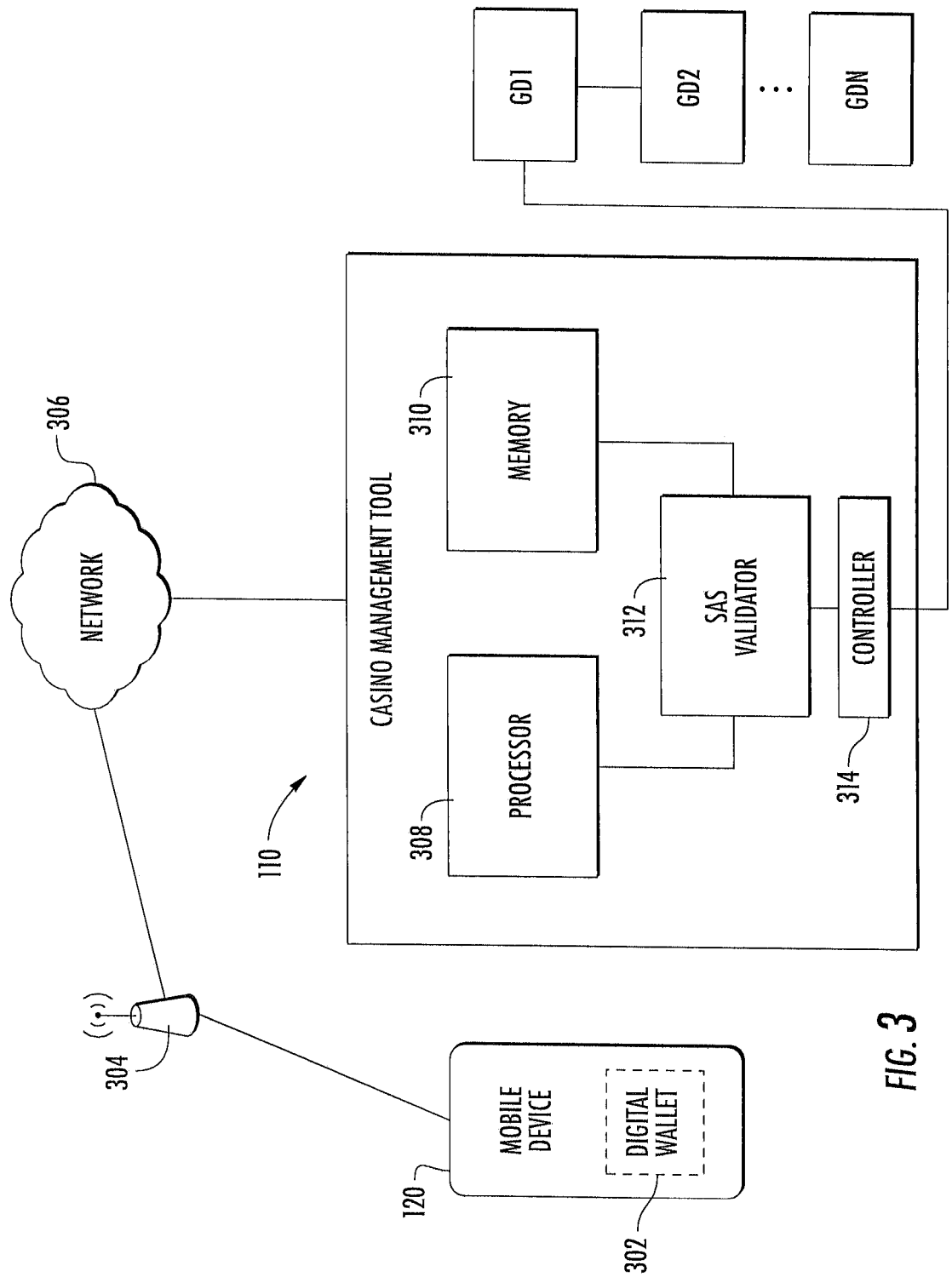
FIG. 3 is a block diagram of a gaming establishment management tool.

Referring now also to FIG. 3 in the drawings, an embodiment of GEMT 110 is illustrated as a casino management tool (CMT). The CMT is connected with virtual wallet 302 mobile device 120 through a base station or wireless access point 304 and mobile or wireless network 306. The CMT includes processor 308 connected with memory 310 and accounting validator 312. Controller 314 is connected to SAS accounting validator 312, processor 308, memory 310, and multiple gaming devices. Controller 314 communicates control commands between one or more network nodes of the gaming establishment. For example, controller 314 communicates control commands to update a gaming account on mobile device 120. By way of another example, controller 314 communicates control commands to one or more client gaming devices, such as those manufactured by International Game Technology (IGT), Bally Technologies, and Aristocrat Technologies, Inc.

SAS accounting validator 312 is tasked with ensuring valid financial transactions occur using generally accepted accounting principles (GAAP). For example, a user may attempt to add $100 worth of gaming credits to a gaming device, but may actually only have $50 in their virtual wallet. SAS accounting validator 312 would prevent the transaction from occurring unless there were another source of funds within the virtual wallet.

Figure 4:
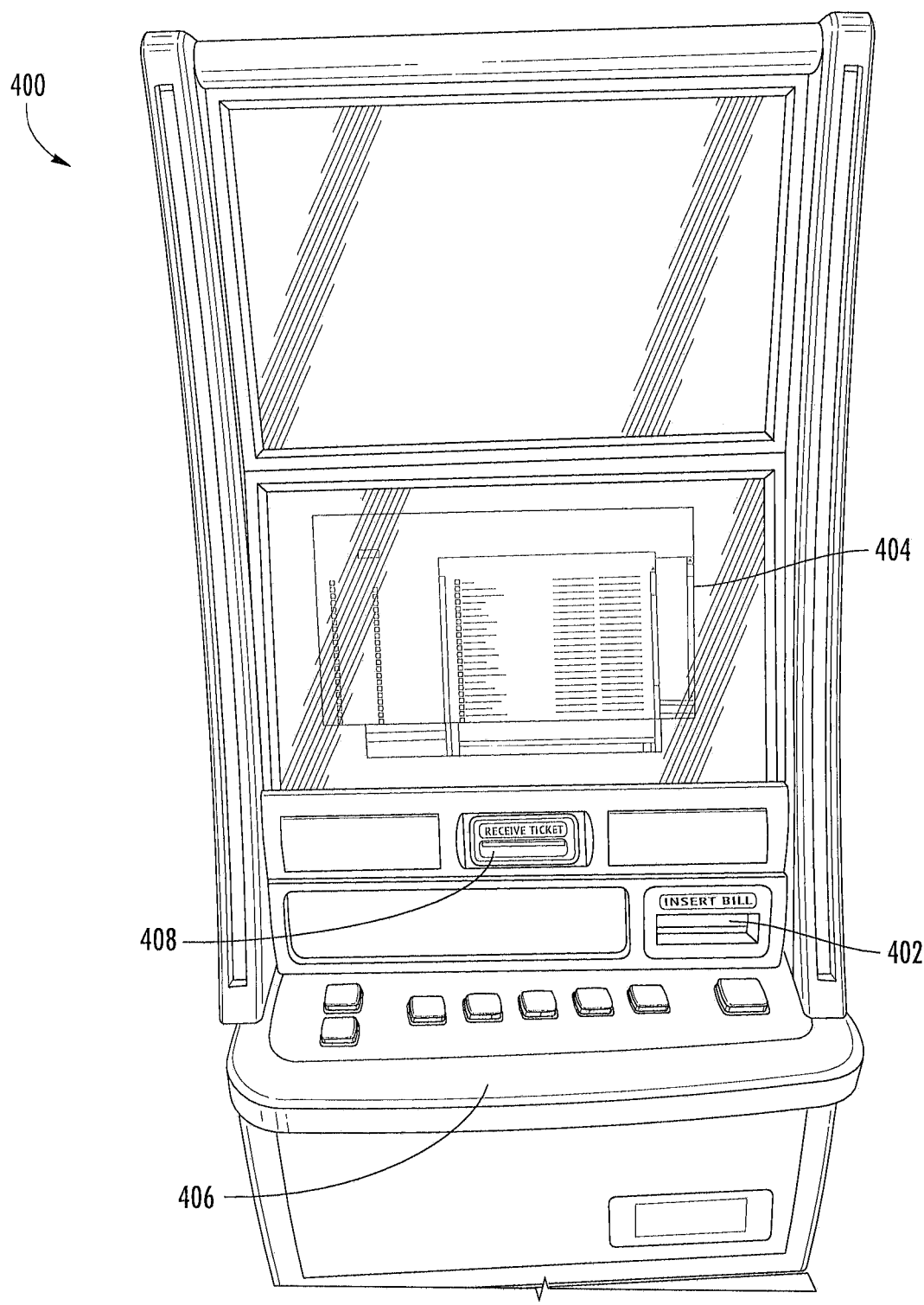
FIG. 4 is a front view of a gaming machine.

Referring now also to FIG. 4 in the drawings, prior art gaming machine 400 is illustrated. Prior art gaming device 400 includes bill/ticket validator 402, display 404, user interface 406, machine printer 408, ticket storage container 410, and SAS client board 412, such as a slot machine interface board (SMIB). Gaming machine 400 uses a TITO system, where cash or a cash voucher ticket is inserted into validator 402, resulting a new ticket printed and output from machine printer 408 upon termination of game play.

Figure 5:
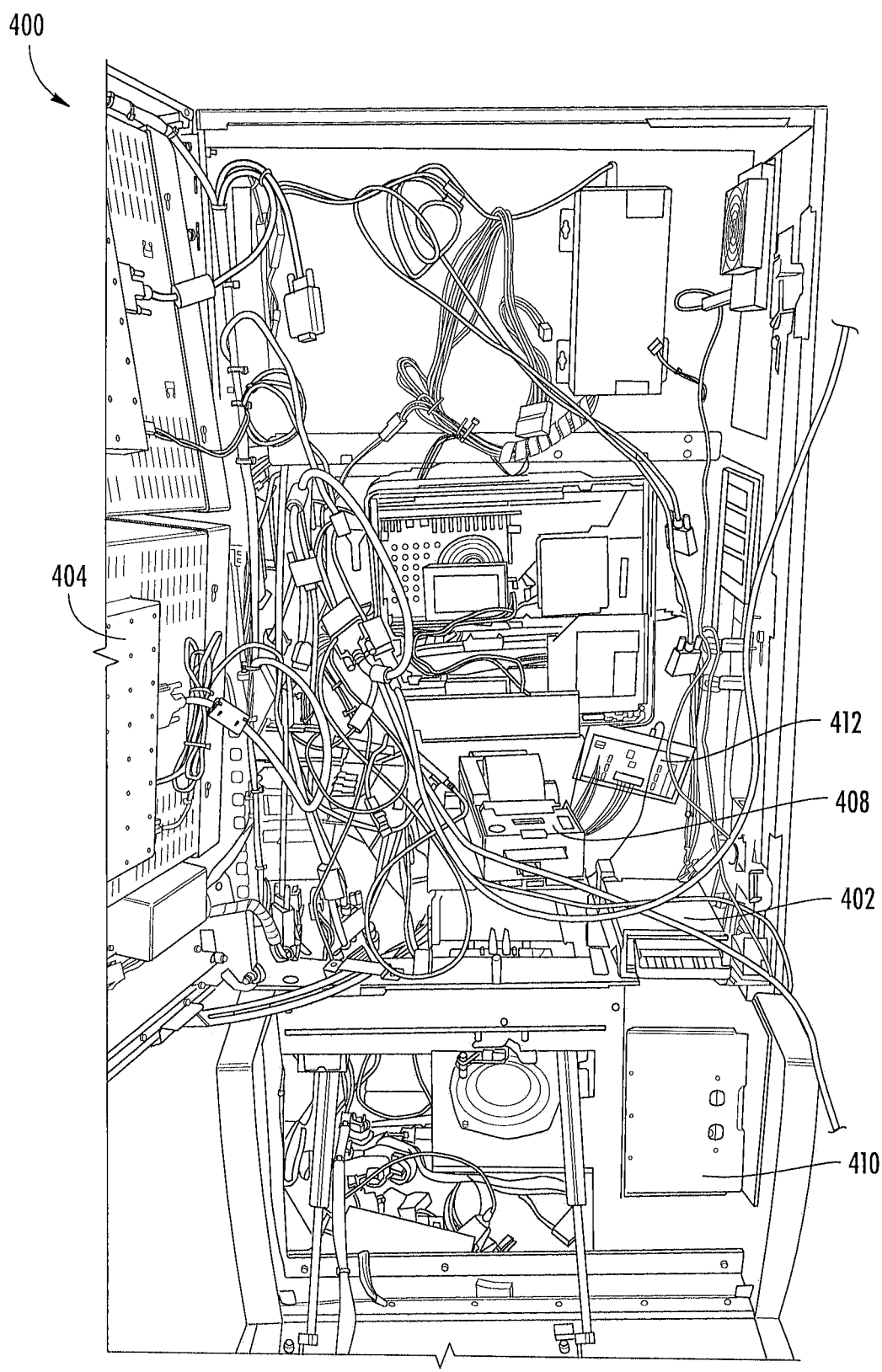
FIG. 5 is a front view of the internal assembly of the gaming machine shown in FIG. 4.

Referring now also to FIG. 5 in the drawings, internal components of prior art gaming machine 400 are illustrated. The bulkiness of the prior art gaming machine is due, at least in part, to the unnecessary machine printer 408, bill/ticket validator, and storage bins.

Figure 8:
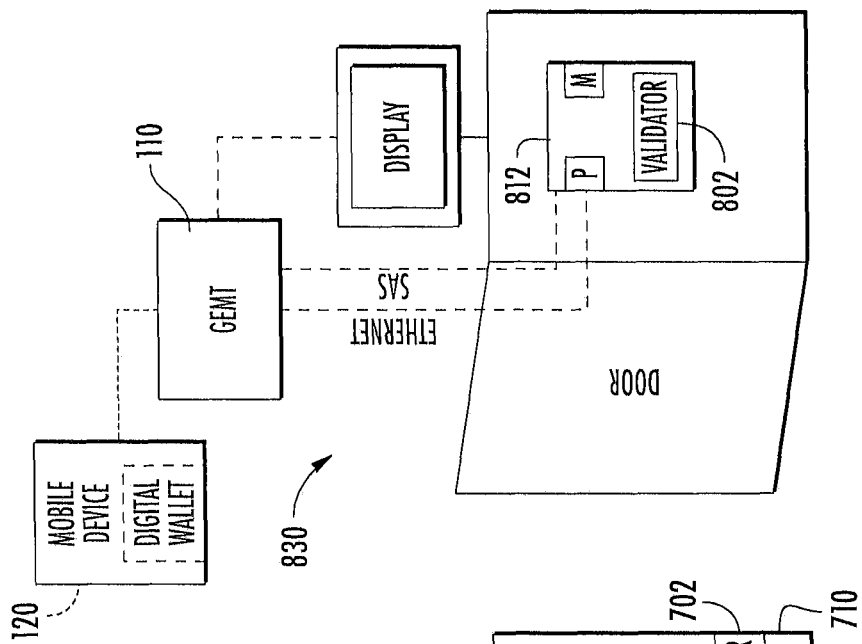
FIG. 8 is a block diagram of an alternative embodiment of a gaming machine depicting internal components of the gaming machine according to aspects of the present invention.
Figure 7:
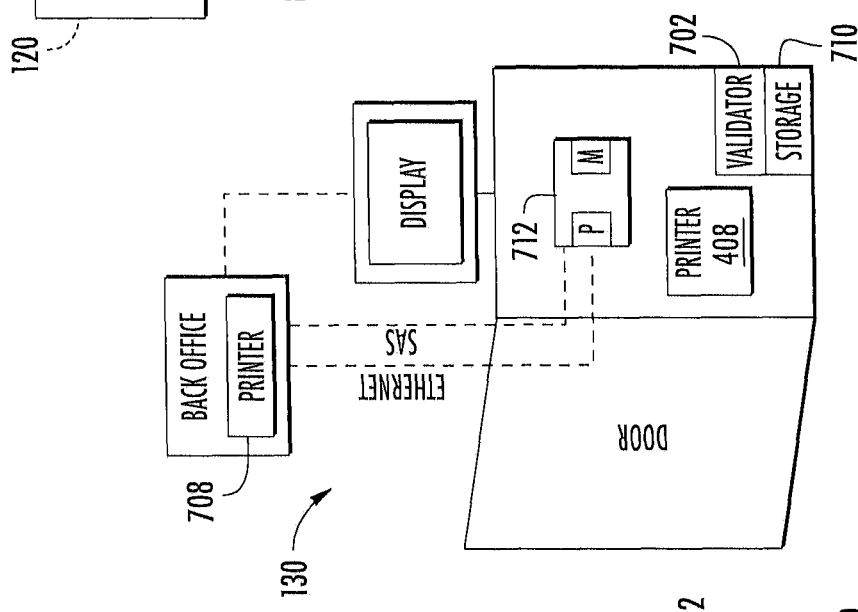
FIG. 7 is a block diagram of a preferred embodiment of a gaming machine depicting internal components of the gaming machine according to aspects of the present invention.
Figure 6:
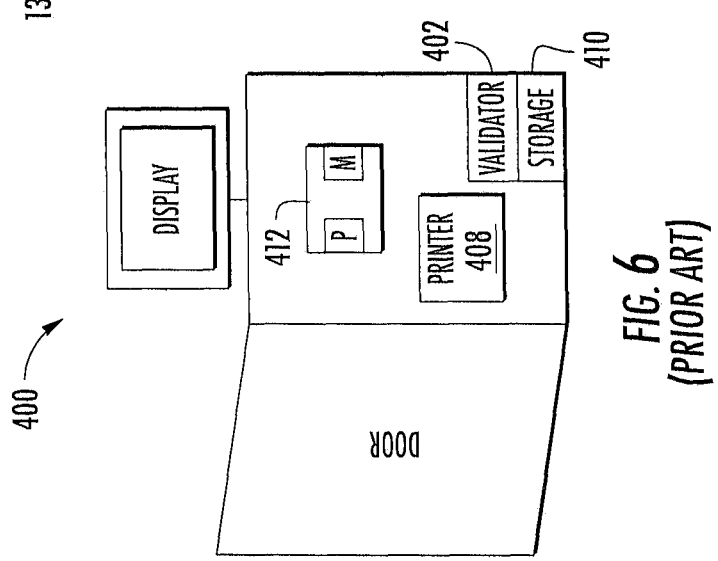
FIG. 6 is a block diagram of a gaming machine depicting internal components of a prior art machine.

Referring now also to FIG. 6 in the drawings, a block diagram of prior art gaming machine 400 is illustrated relative to FIG. 7 and FIG. 8 in order to describe features of the present application.

Referring now also to FIG. 7 in the drawings, gaming device 130 includes machine printer 408, bill/ticket validator 702, cash and ticket storage 710, and remote printer 708. Gaming device 130 is connected to communicate with remote printer 708 over a first, second, or third communication channel. The first communication channel connects the back office to each physical machine and each virtual machine that presents a game to a customer. Typically, GEMT 110 is located between the printer and the gaming machines. The primary communication channel includes an Ethernet, fiber optic, or similar hardware and communication protocol. The secondary communication channel connects the back office printer and the SMIB via the Ethernet protocol or via a Serial Attached SCSI (SAS) protocol. This allows gaming device 130 to have one or more backup communication channels in case the primary channel to GEMT 110 is slow or interrupted.

Although FIG. 7 depicts only a single back-office printer, multiple redundant printers are encompassed by the present invention. For example, continuous game play together with continuous printing occurs when at least a second printer is used for printing cashout transaction tickets while a first printer is reading or locating a previous cashout transaction ticket.

Referring now also to FIG. 8 in the drawings, in an alternative embodiment gaming machine 730 includes a validator module 802 as a component of the gaming machine SMIB. Validator module 802 is a system on chip (SOS), field programmable gate array (FPGA), or similar programmable logic module. Validator module 802 is a backup validator in the event SAS validator 310 (see FIG. 3) is unavailable. In this situation, the backup validator and memory of the SMIB are configured to process a virtual ticket from a virtual wallet according to GAAP.

Figure 9:
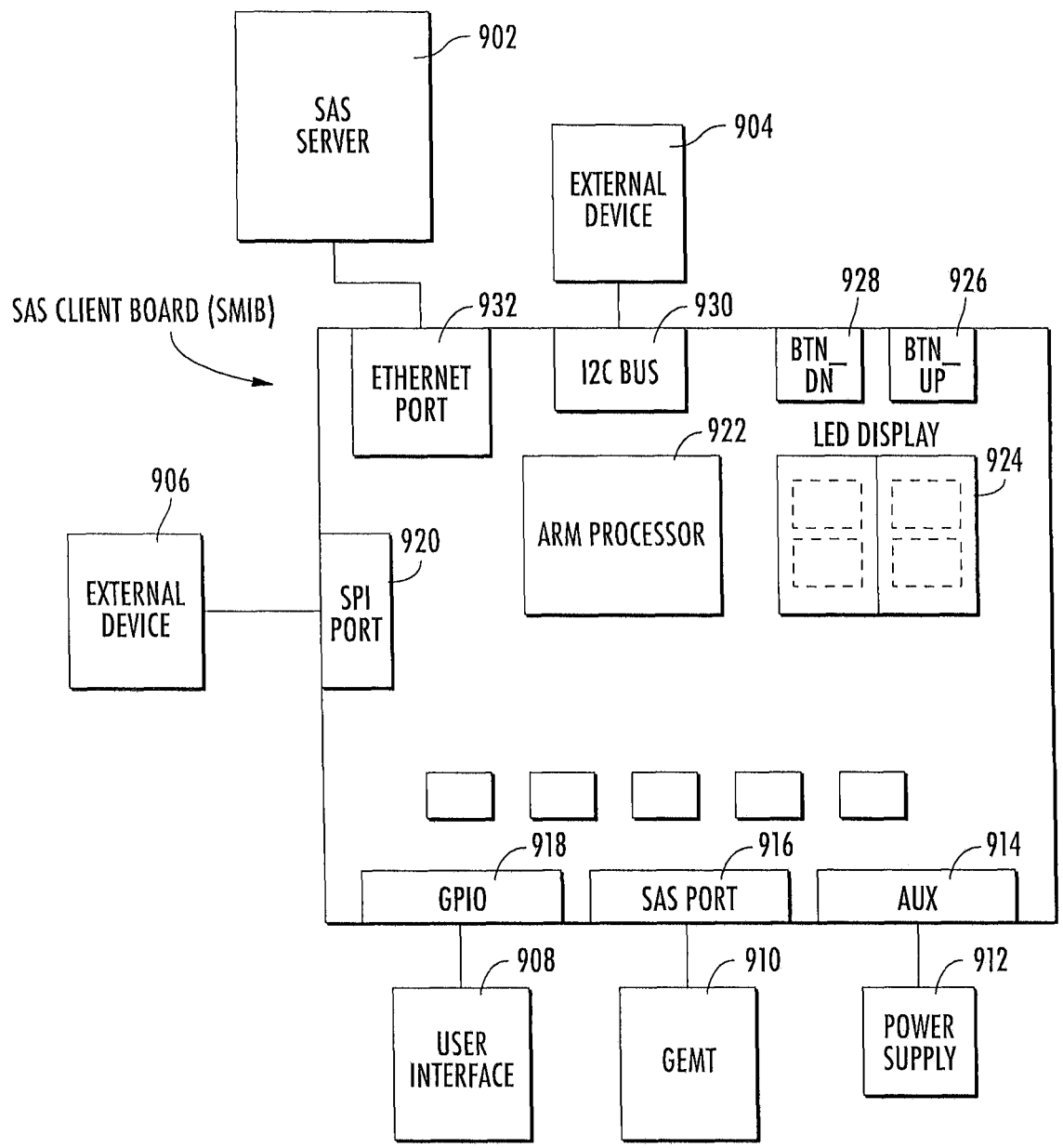
FIG. 9 is a block diagram of a client gaming device.

Referring now also to FIG. 9 in the drawings, SMIB 900 is illustrated. SMIB 900 is configured for gaming machine accounting automation, player tracking, and generating gaming bonuses. SMIB 900 is connected to SAS server 902, first external device 904, second external device 906, user interface 908, CMT 910, and power supply 912. AUX port 914 connects SMIB 900 to power supply 912. SAS port 916 connects the SMIB to CMT 910. General purpose input/output (GPIO) port 918 connects the SMIB to user interface 908. Serial peripheral interconnect (SPI) port 920 connects the SMIB to the second external device 906, such as a magnetic or RFID reader. ARM processor 922 can be any suitable microprocessor. LED display 924 displays messages to a customer (e.g., bonus value, mystery jackpot score, etc.), or to an administrator (e.g., hexadecimal addresses). Circuit board increment button 926 and decrement button 928 are for pre-configuring and adjusting the circuit board settings. 12C bus 930 connects SMIB 900 to second external device 906, including but not limited to, memory expanders, display screen monitors, and speakers. Ethernet port 932 connects SMIB 900 to SAS server 902.

Power supply 912 is typically from 4.5V to 24V. SMIB 900 receives power input to power supply 912 from the gaming machine in which it is installed.

Switches and patch cords connect Ethernet port 932 and SMIB 900. Ethernet speeds to SMIB 900 are 10 and 100 Mbit. User datagram protocol (UDP) is used for transport layer (ISO layer 4) communications.

Figure 10A:
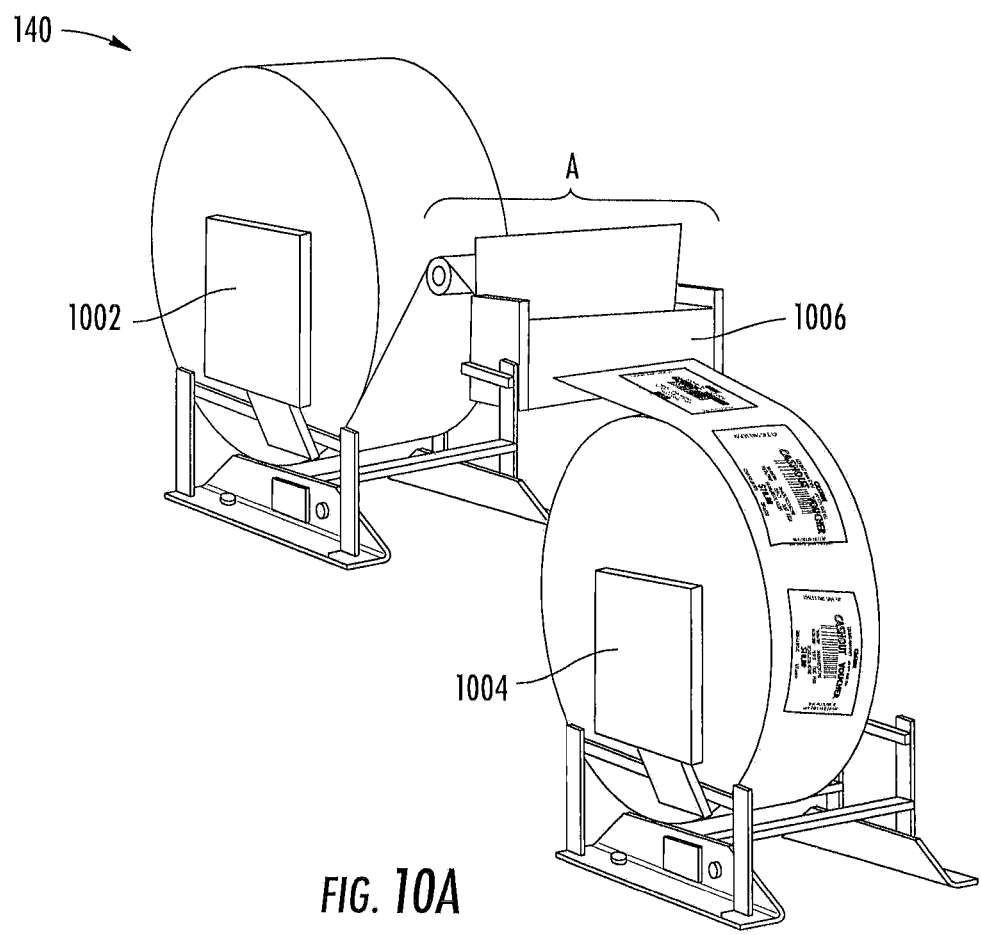
FIG. 10A is a perspective view of a back-office printer.

Referring now also to FIG. 10A in the drawings, printer 140 is illustrated. Printer 140 includes a first actuated printer spool 1002 connected to a second actuated printer spool 1004. Between the printer spools is locator 1006, which provides a printing, locating, and tracking feature for ticket management system 100.

Figure 10B:
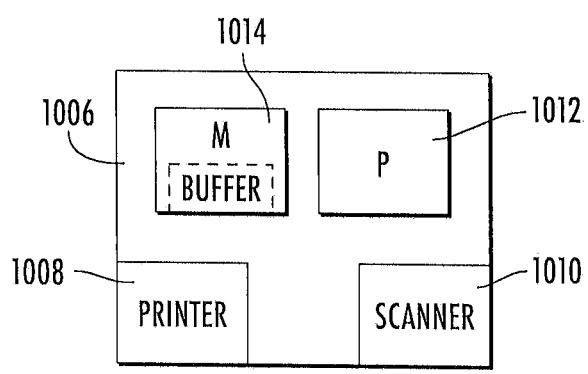
FIG. 10B is a block diagram of internal components of the printer shown in FIG. 10.

Referring now also to FIG. 10B, locator 1006 includes printer head 1008, scanner 1010, processor 1012, and short-term memory 1014. Printer 140 uses a 'first in last out' (FILO) or 'last in first out' (LIFO) storage model, creating an established order to the ticket storage. Short-term memory 1014 includes a buffer or a queue of tickets to locate and read.

Figure 11:
FIG. 11 is a ticket generated by the printer shown in FIG. 10.

Referring now also to FIG. 11 in the drawings, an embodiment of ticket 160 is illustrated. Ticket 160 is depicted having a two-dimensional image key (e.g., barcode), however, any similar image key that is quickly read may be used.

Figure 12:
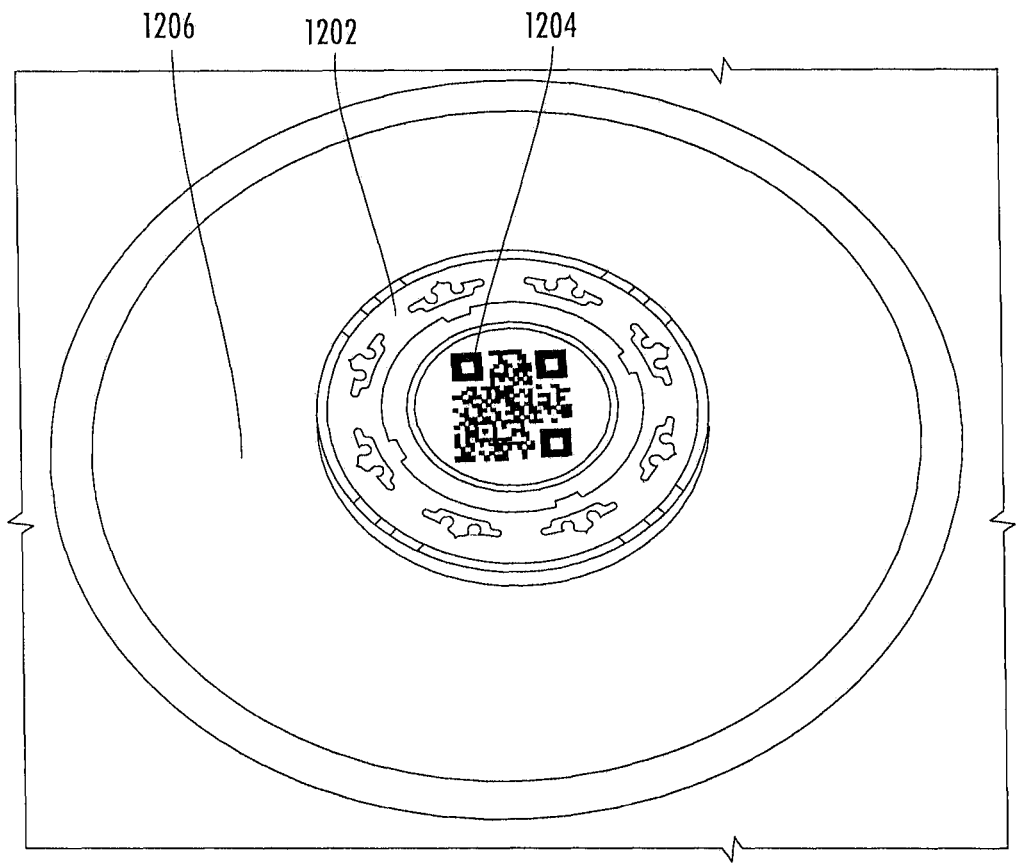
FIG. 12 is a casino chip client gaming device.

Referring now also to FIG. 12 in the drawings, gaming device 1202 is illustrated. Gaming device 1202 includes key image 1204 affixed to the gaming device, such as a 3D QR code. Gaming device 1202 includes a radio frequency identifier (RFID) tag within the device, which is associated with the gaming table location 1206. Because a customer who uses their mobile device to scan key image 1204 has their location associated with a gaming location of a specific game, any winnings and wagers earned at that location are automatically added to the gaming account of the user through the network of the gaming establishment and CMT 110.

Figure 13:
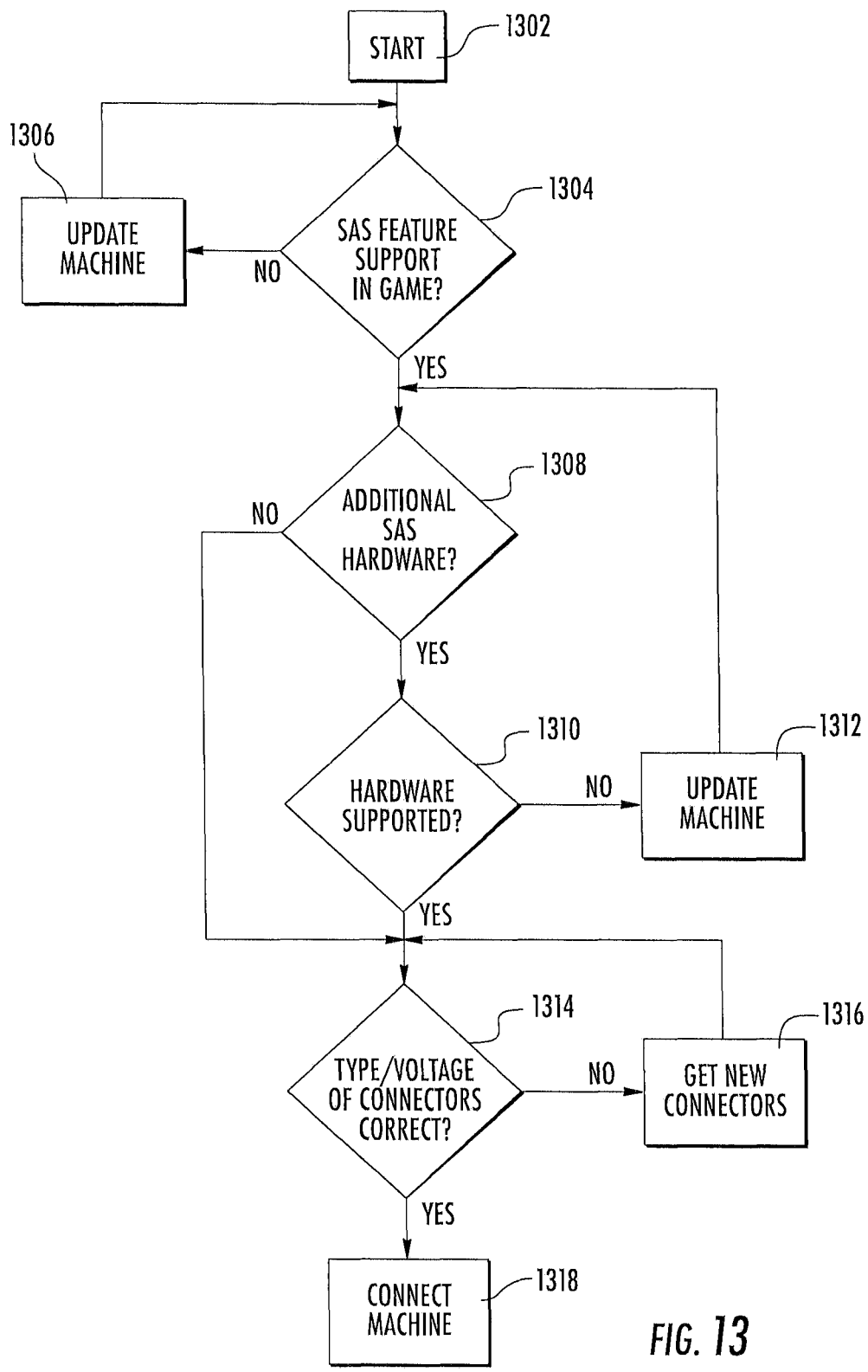
FIG. 13 is a method for connecting a gaming machine.

Referring now also to FIG. 13 in the drawings, method 1300 for connecting a SMIB board to a network gaming machine is illustrated. Method 1300 starts at step 1302 by administrator providing a game to connect to the network of the gaming establishment.

Step 1304 includes checking the game for gaming establishment supported features. This includes checking for SAS supported features, and checking the drivers, libraries, function calls, and executable files of the gaming machine.

Step 1306 includes determining that the gaming machine does not have SAS supported features. Step 1306 further includes contacting the SAS provider of the gaming establishment to update or reprogram the features of the gaming machine.

Returning to Step 1304, the determination is made that the gaming machine has SAS supported features and that they are enabled. The method then proceeds to step 1308.

Step 1308 includes determining that the gaming device has additional hardware features installed. The additional hardware features include, but are not limited to, level shifters and optical isolators.

Step 1310 includes determining that the additional hardware features are not supported.

Step 1312 includes updating the machine to support the additional hardware features. For example, kernel code, drivers and executable files may be re-written or modified to call necessary functions and libraries. Number and data types of input may also be updated. By way of another example, object-oriented software, such as Java, or even the operating system, may be updated.

Returning to step 1310, the determination is made that the additional hardware features are supported. Method 1300 proceeds to step 1314.

Step 1314 includes determining that the type of connectors and associated voltage capacity (e.g., wire gauge) are not correct. For example, a SMIB board has capabilities for voltages associated with TTL signals and RS-232 RX/TX signals. Step 1314 includes checking the voltage levels of the gaming machine against the voltage capabilities of the SMIB before porting the game to the machine.

Step 1316 includes obtaining the necessary equipment for making the porting connections. For example, a USB to TTL converter may be used to connect the SMIB board to an RS-232 port, providing a serial port connection between the gaming machine and the SMIB board. By way of another example, additional resistors may be attached to the SMIB to adjust voltages to appropriate levels.

Returning to step 1314, the determination is made that the voltage and connector types are correct.

Step 1318 includes connecting the SMIB board to the gaming machine. For example, one or more of CAT5, CAT6, SF-8680, SFF-8639, SFF-8681, and sideband connectors are used.

Figure 14:
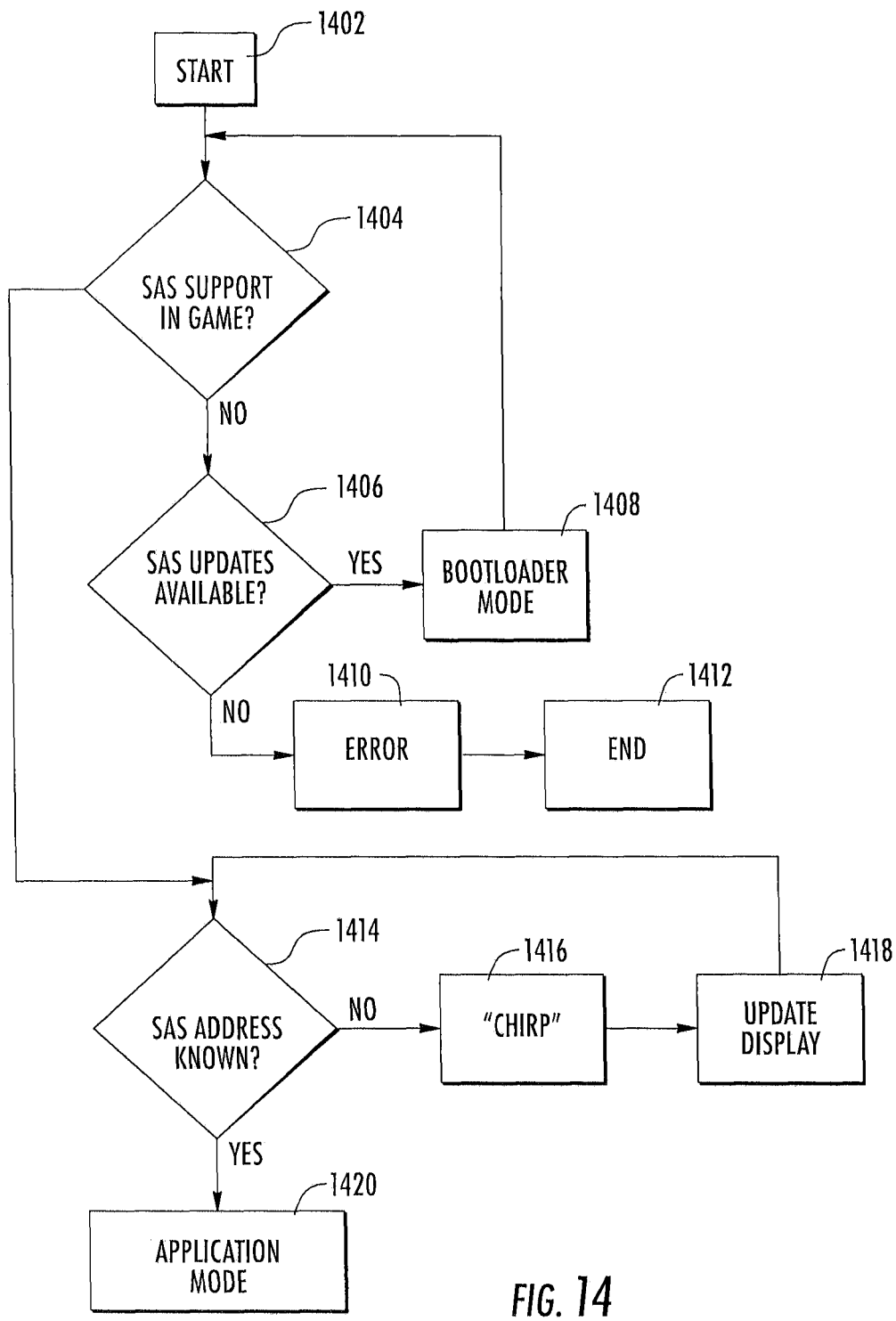
FIG. 14 is a method for enabling an application mode of a gaming machine.

Referring now also to FIG. 14 in the drawings, a method 1400 for enabling an application mode of the gaming machine is illustrated. Step 1402 includes starting the method by properly completing method 1300 and initiating virtual containers and kubernetes associated with the gaming application programmable interface (API).

Step 1404 includes determining that the SAS communication is not supported or not enabled.

Step 1406 includes contacting the server and determining that there are SAS-related updates available. Step 1408 includes downloading necessary updates to the boot sector and running the machine in bootloader mode to install and restart the game.

Returning to step 1406, the determination is made that there are no SAS updates available. Step 1410 includes reporting an error code. Step 1412 includes ending the application mode and updating the display of the gaming machine. For example, the display may show the following error, "Please check SAS compatibility (contact SAS provider)."

Returning to step 1404, the determination is made that the SAS features are supported and enabled for application mode. Step 1414 includes determining that the SAS address is not discovered or known.

Step 1416 includes sending a 'chirp' signal, or using the address of the SMIB. Step 1416 includes updating the LED display of the SMIB to indicate that the SMIB has not obtained the hexadecimal SAS address. For example, the LED may display two dashes "- -".

Returning to step 1414, the determination is made that the SAS address is discovered and known. Step 1414 includes updating the LED display with the hexadecimal SAS address.

Step 1420 includes enabling the application mode. The enablement of application mode enables customers to begin game play at the gaming machine.

Figure 15:
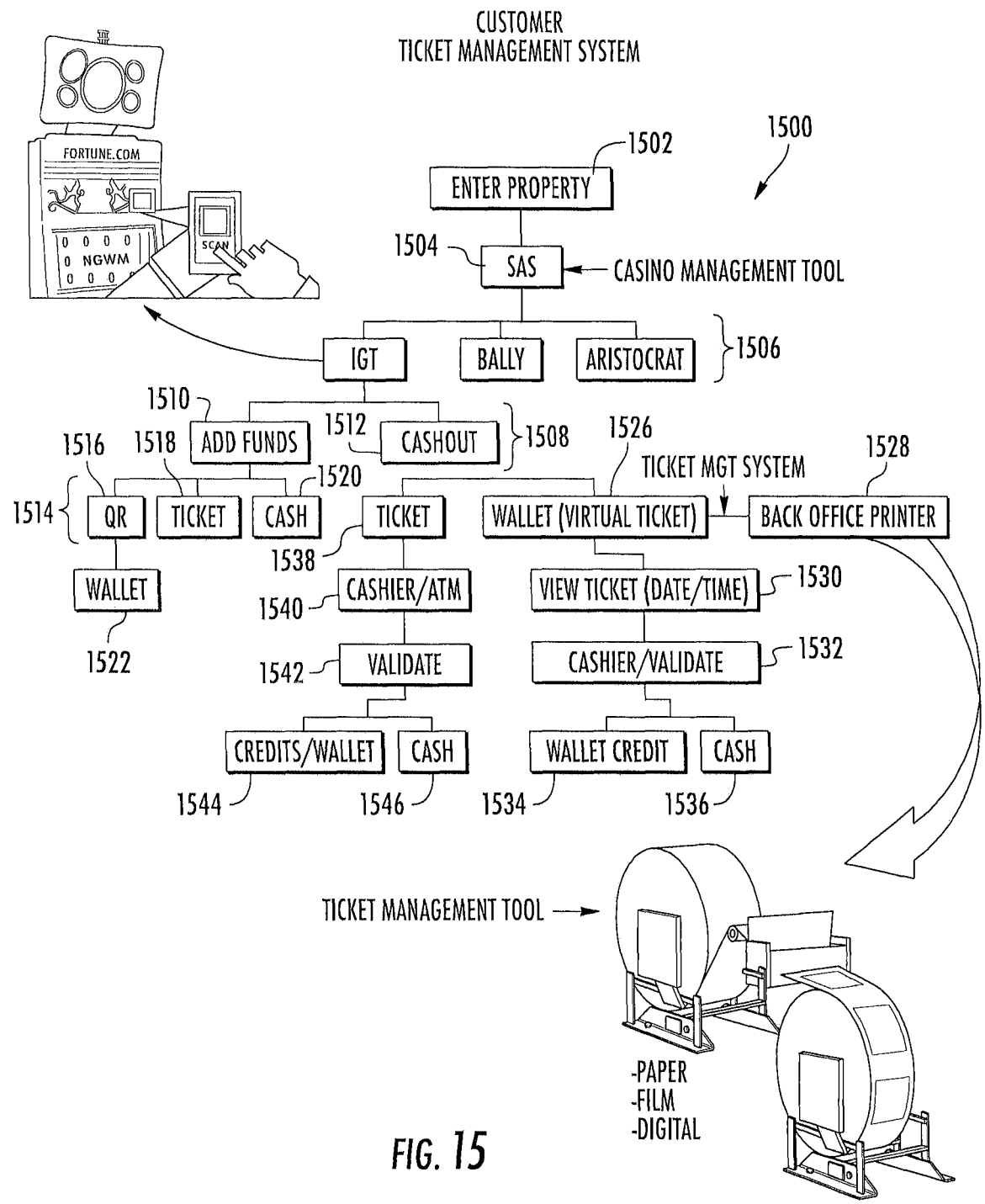
FIG. 15 is a flow chart depicting cash flow using a gaming machine of the present invention in a gaming establishment.

Referring now also to FIG. 15 in the drawings, a method 1500 of producing a cash flow using gaming device 130 is illustrated. Step 1502 includes a customer entering the gaming establishment. The customer has a digital wallet and a gaming establishment user application accessible on their mobile device.

Step 1504 includes a SAS management tool, such as the CMT, establishing a link between a client gaming device.

Step 1506 includes obtaining, by the customer, an authentication key associated with the client gaming device.

Step 1508 includes providing, by the customer activating their mobile device and giving input, a valid transaction to the CMT. For example, at step 1510, the customer adds funds to the gaming account displayed on their mobile device.

Step 1514 includes initiating game play using one of three different options. For example, at step 1516, a QR code is scanned, which indicates the customer is using a virtual wallet to play the game using a first data flag. At step 1518, the customer inserts a ticket or gaming voucher into the validator of the gaming machine, this generates a second data flag to indicate this initialization type. At step 1520, the gaming machine generates a third data flag to indicate the customer initiated game play using cash.

Step 1522 includes accessing a virtual or digital wallet of the customer. For example, if the customer initiated game play using a QR code, then the gaming machine uses the first type of data flag to indicate to the CMT that the digital wallet of the customer will be providing gaming credit funds.

Returning to step 1512, when the customer pushes a cashout button, or otherwise provides a cashout notification, a ticket is printed. Step 1526 includes CMT finding the first data flag to indicate that a virtual wallet initiated game play.

Step 1528 includes sending a print notification to the back-office printer. Step 1530 includes generating a virtual ticket for the customer to view on their mobile device.

Step 1532 includes providing a cashier with the virtual ticket. Step 1534 includes the gaming establishment network updating the virtual wallet of the customer with the cashout amount. Alternatively, the customer may request cash, which the cashier or employee of the gaming establishment provides.

Returning to step 1508, when the CMT obtains the second data flag type, indicating a ticket or voucher initiated game play, and also obtains the cashout notification, the gaming machine is enabled to print a cashout ticket.

Step 1540 includes providing the cashier or an automated teller machine (ATM) the cashout ticket. Step 1542 includes the cashier or ATM validating the ticket. Step 1544 includes updating the virtual wallet of the customer using the CMT of the cashier. Alternatively, step 1546 includes providing cash to the customer upon receiving a request for this form of legal tender.

Figure 16:
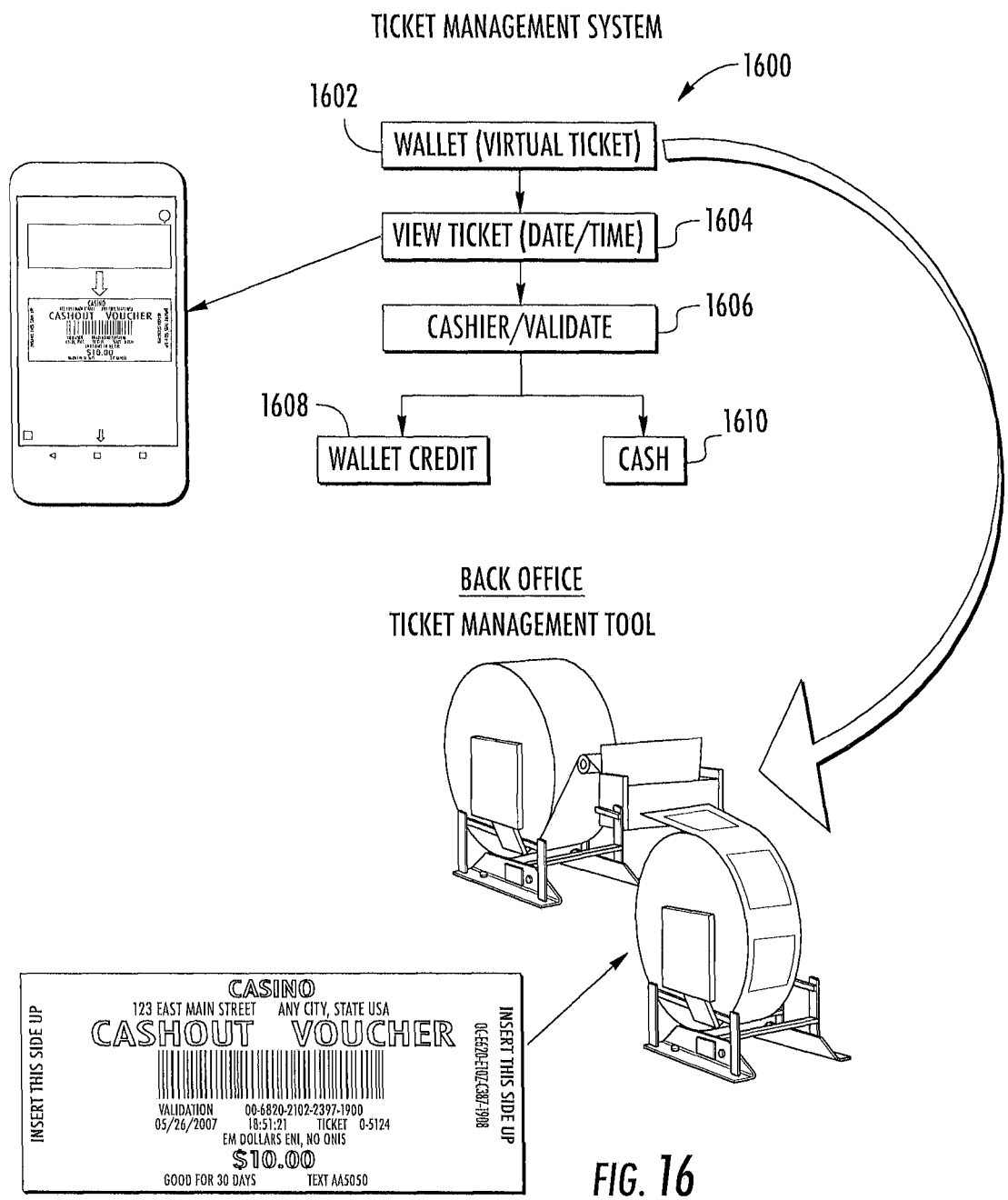
FIG. 16 is a method of printing a ticket.

Referring now also to FIG. 16 in the drawings, a method 1600 for printing a ticket is illustrated. Step 1602 includes a virtual cashout ticket being generated by a CMT. This generating step triggers a print notification being sent to a back-office printer to print a new ticket for the cashout transaction.

Step 1604 includes receiving, at the customer mobile device, a viewable form of the virtual cashout ticket. This ticket includes game machine identifying information and date and time.

Step 1606 includes providing the virtual ticket, by the customer mobile device, to a CMT operated by a cashier. Step 1606 includes validating the virtual ticket.

Step 1608 includes crediting the virtual wallet of the customer. Alternatively, step 1610 includes providing cash to the customer.

It is noted that using the features of the present application allows gaming establishments to accurately track important financial transactions, such as cashout balances and gaming machines associated with them. This allows the gaming establishments to compile profitable data analytics and trends, such as which gaming devices resulted in the highest and lowest cashout balances. Using these trends and analytics, the gaming establish will be able to determine which graphics and displays are associated with the games producing the highest cashout balances, the time of year associated with these balances, and other important data. This enables the gaming establishment to make predictive and anticipatory changes to their gaming machines in order to customize the gaming experience and improve revenues generated.

It is further noted that using features of the present application allows gaming establishments continuous use of their gaming machines. Employees are not required to empty gaming machine storage bins, interrupt game play, or sort containers of cash and tickets. Although physical tickets are generated, they are stored where they are printed, and in a manner that enables easy tracking and locating of specific transactions. Furthermore, the gaming machines are less bulky, resulting a more space-efficient gaming machine.

In an alternative embodiment of the present application, the system is similar in form and function to the system described with respect to FIG. 15; however, in this embodiment the customer is issued a player tracking card by the gaming establishment. The player tracking card is similar to conventional player tracking cards used by gaming establishments to track a customer's usage for rewards purposes. These conventional player tracking cards are generally not tied to cash, instead, they merely track player usage for the purpose of providing the customer with certain "rewards". Any conventional reward cards that are tied to cash, do not track the paper trail of the required tickets generated by the SAS management tool.

However, the player tracking card in this embodiment of the present application is modified to include a digital link to the customer's digital wallet. The digital link between the player tracking card and the customer's digital wallet may be accomplished by various methods, including a direct wireless link between the player tracking card and the player's digital wallet using known and/or proprietary wireless protocols, or one or more links between the components of the gaming machine, the SAS management tool, the user application, and/or other components. In addition, the player tracking card utilized in this embodiment of the present application may include certain security features, such as passwords, passcodes, biometric readers, security chips, memory chips and/or memory circuits, etc.

In this embodiment, when the customer decides to play a particular gaming device, the customer inserts the player tracking card into a card receiver on the gaming device, which may take the form of a card slot. Once the player tracking card is inserted into the card receiver on the gaming device, the player tracking card activates the gaming device and causes selected transactions related to that customer's session on that gaming device to be tracked, recorded, and/or stored by the SAS management tool and/or other devices on the system. When the customer decides to end his session on that particular gaming device, he enters the appropriate inputs on the gaming device, such as pressing a "cashout" button, or touching a "cashout" indicator on a touch screen. Then, instead of the gaming device printing a paper ticket that the customer must carry from one gaming device to another, the information that would previously be printed on a paper ticker is digitally transferred to the player tracking card, the customer's digital wallet, and/or the customer's smart phone, tablet, etc. This way, any information that would have been printed on a paper ticker can be digitally printed and/or stored to the player tracking card, the digital wallet, and/or other components of the SAS management tool. This information can be in the form of digital data, digital images, or both. In this embodiment, as with other embodiments, the ticket information is sent to the back-office printer, where the appropriate information is printed.

According to the present application, the customer can automate how the information on the player tracking card is handled. In those versions of the present application in which the player tracking card includes data pertaining to available cash, the customer may program the player tracking card, the user application, and/or the digital wallet, to transfer and receive money between the player tracking card and the digital wallet once certain threshold amounts are reached. This allows the customer to cancel the player tracking card if it is lost or stolen.

At any time, the customer may present the player tracking card to a cashier to either cashout or have more money added to the player tracking card and/or the customer's digital wallet.

It is apparent that an invention with significant advantages has been described and illustrated. Although the present application is shown in a limited number of forms, it is not limited to just these forms, but is amenable to various changes and modifications without departing from the spirit thereof.

What is claimed is:

1. A ticket management system, comprising:
   a casino management tool;
   a casino gaming device being communicatively coupled to the casino management tool;
   a digital player tracking card configured to activate the casino gaming device, such that selected transactions conducted during a player's use of the casino gaming device are tracked and recorded;
   a printer remotely connected to the casino management tool for printing tickets containing data related to the selected transactions;
   a scanner connected to the printer for recording and storing a copy of the data printed on each ticket; and
   a mobile device having a digital wallet, the digital wallet being digitally linked to the player tracking card;
   wherein the printer is remotely connected to the casino gaming device, the printer being configured to print tickets related to selected transactions.

2. The ticket management system of claim 1, wherein the player tracking card is configured to store data related to available cash.

3. The ticket management system of claim 1, wherein the data related to the selected transactions is digitally transmitted to the player tracking card.

4. The ticket management system of claim 1, wherein the data related to the selected transactions is digitally transmitted to the mobile device.

5. The ticket management system of claim 1, wherein the player tracking card comprises:
   one or more selected security features.

6. The ticket management system of claim 5, wherein the one or more selected security features comprise:
   a password;
   a passcode;
   a biometric reader;
   a security chip;
   memory chips;
   memory circuits.

* * * * *